United States Patent Office 2,927,010
Patented Mar. 1, 1960

2,927,010

PROCESS FOR THE BENEFICIATION OF SYLVITE ORES

Ira M. Le Baron, Evanston, Ill., assignor to International Minerals & Chemical Corporation, a corporation of New York No Drawing. Application December 30, 1957
Serial No. 705,824

6 Claims. (Cl. 23—297)

The present invention relates to the beneficiation of sylvite ores. More particularly it relates to a combination process whereby high concentrations of sylvite may be obtained from sylvinite ores. Still more particularly, it relates to a combination process utilizing an electrostatic separation step and a fractional crystallization step wherein concentrated sylvite values are obtained from ores of the sylvinite type.

Potassium chloride-bearing or sylvite ores are found in the United States, primarily in the Carlsbad area of New Mexico. A typical analysis of such ore is as follows:

| | Percent |
|---|---|
| Sylvite (KCl) | 31 |
| Halite (NaCl) | 65 |
| Other constituents or impurities consisting of silicates, sulfates, etc. | 4 |

Electrostatic and crystallization methods for recovering sylvite from sylvinite ore are known. Electrostatic separation methods readily produce 40 to 58% $K_2O$ concentrates of sylvite from sylvinite ore containing some sulfate or from high sylvinite content mixed ores.

Crystallization methods have also been developed for separation of various salts of potash ores to recover sylvite wherein the sylvite is selectively crystallized from a hot aqueous solution of soluble constituents of the ore.

Sylvinite or almost always has some insoluble material of a clayey nature, commonly called slimes, intimately associated with the soluble chlorides. The slimes content of sylvinite ores varies from relatively low concentrations of about 0.5% by weight up to concentrations as high as 4% by weight and sometimes even higher. In the crystallization method of recovering sylvite from sylvinite ores, the ore is contacted with hot brine which is unsaturated with respect to sylvite. The sylvite goes into solution and leaves suspended in the solution the slimes and undissolved halite.

The presence and nature of the slimes is detrimental to the separation of crystals of sylvite from brine and in the commercial process for recovering sylvite from sylvinite by solution and crystallization, the hot slurry of sylvite and halite, containing undissolved slimes, is filtered or otherwise treated to remove the slimes and undissolved halite. The rate of settling of the slimes in a thickener and/or the rate of filtration of solutions containing slimes depends to a considerable extent upon the amount of slimes and the nature of the slimes.

It is an object of the present invention to provide a combination process for the recovery of sylvite which overcomes the shortcomings and disadvantages of processes heretofore in use.

It is another object of this invention to provide a combination process whereby high concentrations of sylvite may be obtained from sylvinite ores.

A further object of this invention is to provide a combination process for the recovery of sylvite from sylvinite ores utilizing an electrostatic separation step and a solution-crystallization step wherein the solution formed in the solution-crystallization, which solution contains slimes, has desirable settling characteristics.

These and other objects of the invention will be apparent to those skilled in the art from the detailed description of this invention.

It has now been discovered, and the present invention is partly based on this discovery, that when sylvite concentrates, obtained from electrostatic separation processes, are subjected to a solution and crystallization step to further concentrate the sylvite, the solution containing slimes may readily be filtered and has desirable settling characteristics. The exact reason for this is unknown. It appears that in the electrostatic separation step, some beneficial resolution of or change in the nature of the slimes occurs, which aids in the subsequent treatment of the electrostatic concentrate in the solution and crystallization steps of the process. In any event, it has been found that the electrostatic concentrate contains only a portion of the slimes originally in the ore.

Potash ores which may be beneficiated by this method are the natural ores such as sylvinite; mixed ores consisting of magnesium sulfate-potassium sulfate complex, potassium chloride, and sodium chloride, and the like; and natural salt mixtures and salt mixtures crystallized from naturally occurring brines as well as artificially created brine solutions.

In accordance with the present invention, a potash-bearing material, such as a slime-bearing ore of relatively low sylvite content, is prepared for charging and electrostatic separation by any one or more of a number of preliminary treatments. Ore to be separated electrostatically must be dried to substantially eliminate conductivity of films on the surface of the particles. If the ore is to be heated, a wide range of temperature may be used, depending upon the degree of concentration desired in the electrostatic concentration operation and the nature of the feed. Mechanical mixtures of KCl and NaCl including mixtures formed by crystallization of salts from solution or from natural brines such as are found in the Bonneville, Utah and Searles Lake, California areas, need not be heated to the high temperatures to which other ore materials must be heated to attain high degrees of concentration in the electrostatic separation.

Ore material, when given an initial heat treatment at temperatures of less than about 450° F., i.e., 200 to 450° F., is substantially incapable of producing a concentrate in excess of 65% by weight of potassium chloride (about 41% $K_2O$). If given the higher initial heat treatment at temperatures in the range of about 600° F. up to just below the melting point of the ore, higher initial concentrates are obtained but reheating is necessary during the secondary concentration operations regardless of whether the initial heating was in the high or low temperature ranges mentioned above. Potash materials may also be prepared for electrostatic separation by preferential surfacing with flotation reagents such as fatty acids or amines, and then rendering the ore particles surface dry.

In the novel method of this invention, potash ore, for example sylvinite as received from the mine, is comminuted to economical liberation size to produce a somewhat granular feed material. This granular material is sized to produce a granular feed of a particle size in the range of about 8 mesh to about 200 mesh and preferably a feed consisting of −8 +150 mesh particles. This comminution of the ore may be carried out in a ball mill, roller mill, hammer mill or any other suitable type of grinding and crushing apparatus. When the ore is ground to the mesh size indicated above, the potassium values of the ore are substantially liberated from the halite values and the ore is ready for treatment in accordance with this invention.

If the preliminary treatment is to be heat treatment, sized granular material, depending upon the source of the ore or the degree of concentration desired in the first separation step, may be heated to temperatures such that, upon passage through the equipment to the electrostatic separation unit, the solids have a temperature in the range of about 125° F. to about 350° F. which usually requires heating to a temperature in the range of about 150° F. to about 450° F. or higher. It is preferable, however, that the potash ore be heated to temperatures in excess of about 600° F. Sylvinite ore is generally heated to a temperature in the range between about 600° F. and about 1000° F. However, when heating at the lower end of this temperature range, a longer period of time is required to accomplish the desired result of rendering the ore susceptible to contact potential methods of charging. Heating the ore to temperatures of at least 600° F. for a period of about 5 to 20 minutes' duration results in conditioning the ore so that upon cooling it responds to the attractive and repulsive forces operating in an electrostatic field.

Therefore, heating of slime-bearing potash ore to render it susceptible to electrostatic separation is an operation in which the temperature of treatment will be varied according to the time of treatment. Higher temperatures accomplish the desired result in a shorter period. In the kiln operation where the material enters at about 80° F. and is discharged at about 800° F., the entire holding period in the kiln is about 5 to about 30 minutes. Operating temperatures in the range of about 800° F. to about 900° F. are effective if the material is raised to this temperature and then held at the temperature for a period varying from about 3 minutes to about 10 minutes respectively. Treatment in the range of about 750° F. to about 850° F. is preferred in kiln operation with a holding time of between about 10 minutes and about 20 minutes in the kiln.

Following the heat treatment the granular feed material is cooled just prior to its entry into the electrostatic field. The feed material is cooled to a temperature in the range of about 100° F. to about 425° F. and preferably to a temperature in the range of about 140° F. to about 220° F.; optimum separation temperatures, of course, varying with differences in ore composition. Cooling of the ore to a temperature in this range is critical, and separations while the ore is hotter than 425° F. show no appreciable upgrading of the material removed at the point where a concentrate would normally be collected. It has been observed that the effectiveness of separation of sylvite from halite rapidly increases as the temperature range of 150° F. to 185° F. is approached, indicating that the temperature of the particles at the time of being separated, particularly in the first rougher separation stage, should be in the range of approximately 150° F. to 185° F. for best separations of sylvinite ore. Separation of heat treated ore when substantially cold, however, can be effected.

In order to accomplish separation, the ore particles are electrostatically separated either by the free fall method or by so-called conductivity separation methods. If the separation is made by the free fall method, the ore particles must be differentially electrified before passage through the electrostatic field, i.e., particles of sylvite, for example, must carry an electrical charge of different character or of different magnitude from that of the halite. Differential electrification may be created by utilizing the contact potential phenomenon such as by frictional or rubbing contact between the particles either when in contact with a grounded donor plate or not. When the quantities of different ore components are not widely disproportionate, the contact potential charging is effectively carried out by agitating or movement of the mixture, and under such conditions a donor plate may be disadvantageous although not sufficiently so that elimination of the donor plate is at all critical. When charging concentrates, particularly of relatively high purity, contact potential will give only weak charging, and at this stage use of a donor element is generally advantageous. By "grounded donor plate" is meant an element of low work function which readily exchanges electrons with the ore particles when the plate is grounded to the earth, and for optimum charging would have a work function between the two components which it is desired to separate. Such donor plates may be of graphite, galvanized iron, zinc, aluminum and the like. This differential electrification may be created, for example, by passage down an inclined chute (preferably vibratory) during cooling operation or after reaching separation temperature.

Where ore particles are subjected to a series of separations, the feed to subsequent stages often exhibits progressively reduced response to the electrostatic fields. This reduced response is probably due to loss or leakage of charges from the granular particles. Such weak responding concentrates may in one form of treatment be restored or induced to activity by passage through an impactor to create new surfaces and again recharging by frictional or other forces giving rise to differential electrification, which recharging may include a reheating in accordance with the treatment hereinabove described.

The strength of the electrostatic field which will effectively alter the path of ore particles varies with the average particle size and the type of material. The field gradient or strength may vary from about 1,000 volts to about 5,000 volts per inch of distance between electrodes in separating materials of relatively fine particle size and from about 3,000 volts to about 15,000 volts per inch for beneficiating of coarser particles. In all such discussion of field strength it must be borne in mind that corona discharges which ionize are to be avoided. In general, it is preferred to operate with a total impressed difference of potential in the range of about 30,000 volts to about 250,000 volts. This voltage should be maintained in the form of a direct current potential substantially free of alternating current components, i.e., filtered direct current low in the so-called alternating current ripple. A steady supply of direct current may also be obtained with less expensive filtering apparatus by the use of such equipment as a rectified radio frequency power supply.

When the material to be separated passes through a series of electrostatic fields, the preferred mode of operation provides for the collection of three fractions from each electrostatic field. The concentrate fraction from each separation unit becomes the feed to the next electrostatic field. A middling fraction is usually recycled to a point where the composition of the recycled middling corresponds roughly to the compositoin of the feed material to the separation unit. Tail fractions may or may not be combined and usually are passed to so-called scavenger electrostatic separations wherein additional values are separated from the final tail which is intended to be a throw-away material.

Cooling conditions at times may be such that between about 50% K$_2$O and about 55% K$_2$O products can be secured in three consecutive quick passes through electrostatic fields without reheating the solids. On the other hand, cooling of solids as during the winter seasons when atmospheric temperatures range, for example, between about 20° F. and about 45° F., may be so fast that precautions must be taken in the handling of a rougher concentrate to obtain satisfactory separation in a first cleaner stage without reheating between the rougher and first cleaner operation. When conditions prevail such that substantial cooling of the ore particles takes place during the operation, reheating is found to be beneficial in order to make products of acceptable commercial grade; i.e., consistently to obtain about 55% K$_2$O products, and such reheating is indispensable in the production of higher grade products.

In general, it has been found that secondary heat treatment, i.e., treatment wherein the temperature of the solids is maintained at or raised to or above 200° F. between separation stages following the first or rougher separation, not only produces products of higher $K_2O$ content, but also reduces the number of separation stages necessary to obtain products meeting such grade specifications.

Secondary heat treatment as by blowing hot gases through or over the comminuted material so that the temperature of the solids is brought to between about 200° F. and about 600° F. appears to permit the upgrading of 18% to 20% $K_2O$ content ore to about 55% $K_2O$ concentrate, but no higher, irrespective of the number of separation stages.

A further discussion of an electrostatic method for treating sylvinite ores may be found in James E. Lawver, United States Patent No. 2,762,505.

Potassium chloride or sylvite concentrates prepared by the above-described electrostatic beneficiation method are next subjected to a process of solution and recrystallization such as is practiced in Germany for recovering sylvite from Stassfurt potash deposits. The process makes use of the solubility relationships in the system

$KCl$—$NaCl$—$H_2O$ to crystallize a potassium chloride which may have a purity as high as 99%. The sylvite concentrate is, accordingly, mixed with water and preferably with hot brine to dissolve the sylvite from the concentrate. The hot brine is unsaturated with respect to sylvite and is preferably used in such amount that the final brine is substantially saturated with respect to sylvite. It is also preferred that the hot brine used be substantially saturated with respect to halite. When the concentrate is mixed with hot brine that is unsaturated with respect to sylvite and substantially saturated with respect to halite, only the KCl in the concentrate dissolves in the brine and the halite remains undissolved and may be removed from the solution by settling, filtration, etc.

The mixture formed by mixing the sylvite concentrate with hot brine is a slurry which contains the finely divided slimes dispersed therethrough and in some instances may contain undissolved halite. In accordance with this invention the slurry is subjected to a thickening operation or a filtering operation or both, to remove the slimes from the solution. As hereinbefore mentioned, it has been discovered that solutions formed from sylvite concentrates of electrostatic benefication processes have the slimes in such a condition or state that the solution has favorable settling and/or filtration characteristics.

A flocculant may be added to the slurry before thickening and/or before filtration. The flocculant is a material, inorganic or organic, which flocculates the slimes and thereby aids in settling the slimes. Any suitable flocculant may be used as desired such as starches, cellulose, hydroxyethyl cellulose, dextrins, lignin, vegetable gums, mannogalactose, proteinaceous colloids, etc.

In some instances, the supernatant solution following a thickening operation is relatively free of suspended matter and the KCl may be directly precipitated from the solution. In some cases, however, especially where the thickening has not been thorough, the supernatant liquid may contain some slimes which may be removed by filtration.

The solution recovered from the thickening operation, and/or filtration is cooled to precipitate KCl crystals, which are the product of this invention. These crystals may be recovered from the mother liquor by any suitable method such as centrifugal separation, filtration, etc. Even where the hot brine used in the solution step is saturated with respect to halite, upon cooling of the solution, only potassium chloride crystallizes out, since when cooled the solution becomes unsaturated with respect to sodium chloride.

As illustrative of the character of the instant invention, but in no wise intending to be limited thereby, the following example is given:

Example

Natural sylvinite ore from the Carlsbad section of New Mexico was comminuted in a roll crusher and then in a hammer mill. The comminuted ore was screened to produce a fraction containing particles in the range of —14 mesh to about +150 mesh size.

The comminuted material was heated to approximately 750° F. in a hot air oven. The material was removed from the oven and the particles cooled by agitation in air having a temperature initially of about 80° F. When the particles cooled to approximately 350° F., the particles were delivered to a feed hopper and cascaded downwardly through a vibratory trough which was grounded to the earth by an electrical conductor. Material on the trough passed as a layer of ¼" and ½" depth of material. The granular material thereby became differentially charged, the halite charging positively and the sylvite negatively, and at the time of the drop through the electrostatic field, had a temperature of about 250° F. The material was dropped between vertical electrodes at a rate of approximately 2000 pounds per hour per foot of horizontal electrode width. The electrodes consisted of two spaced rows of 3" diameter aluminum tubes arranged with approximately 1" of space between the tubes. The rows of electrodes were approximately 10" apart. The voltage impressed upon the electrodes was approximately 100,000 volts between the oppositely charged electrodes. After four passes through electrostatic fields of the same intensity as that for the initial separation, with a finished concentrate and tailings drawn off from each pass, a final concentrate having a $K_2O$ concentration about twice that in the original sylvinite was obtained. The analysis of the concentrate was:

| Percent $K_2O$ | Percent $Na_2O$ | Percent Water insoluble |
|---|---|---|
| 45.8 | 17.9 | 5.98 |

Twenty grams of this concentrate were mixed with 100 ml. of a brine at about 104° C. for forty-five minutes. The brine used was prepared by treating a potash ore with water. Afterwards the mixture was filtered, while hot, to remove the brine-insoluble material. The filtrate was cooled to about 80° F., thereby crystallizing out crystals of sylvite. The crystals were removed from the mother liquor by filtration. The crystals had the following analysis:

| Percent $K_2O$ | Percent $Na_2O$ | Percent Water insoluble |
|---|---|---|
| 59.0 | 2.7 | 0.07 |

This example clearly illustrates the preparation of a high purity sylvite product from a sylvinite ore when following the teachings of the present invention.

The description of the invention utilized specific reference to certain process details; however, it is to be understood that such details are illustrative only and not by way of limitation. Other modifications and equivalents of the invention will be apparent to those skilled in the art from the foregoing description.

Having now fully described and illustrated the invention, what is desired to be secured and claimed by Letters Patent is set forth in the appended claims.

1. A method of recovering sylvite from sylvite-containing slime-contaminated ores which comprises comminuting the ore to liberate the sylvite from the gangue components of the ore, heating the comminuted ore to a temperature of at least about 150° F. and below the fusion point of the ore, differentially charging the heated ore, passing differentially charged ore through an electrostatic field at a temperature not greater than about 425° F. to produce a slime-containing sylvite concentrate, mixing the slime-containing concentrate with aqueous media selectively to dissolve the sylvite and separating the insoluble material including the slimes from the solution and precipitating substantially slime-free sylvite from the solution.

2. A method according to claim 1 in which the ore is comminuted to −8 +200 mesh.

3. A method according to claim 1 in which the comminuted ore is heated to a temperature between about 600° and about 1000° F.

4. A method according to claim 1 in which the comminuted ore is heated to a temperature above about 425° F. and then cooled to a temperature below about 425° F. prior to electrostatic separation.

5. A method according to claim 1 in which the slime-containing concentrate is admixed with hot brine substantially saturated with respect to halite selectively to dissolve the sylvite.

6. A method of recovering sylvite from sylvite-containing, slime-contaminated ores which comprises comminuting the ore to −8 +200 mesh to liberate the sylvite from the gangue components of the ore, heating the comminuted ore to a temperature between about 600° F. and about 1000° F., differentially charging the heated ore, passing the differentially charged ore through an electrostatic field at a temperature not greater than about 425° F. to produce a slime-containing sylvite concentrate, mixing the slime-containing concentrate with hot brine substantially saturated with respect to halite selectively to dissolve the sylvite, separating the insoluble material including the slimes from the solution, and precipitating substantially slime-free sylvite from the solution.

References Cited in the file of this patent
UNITED STATES PATENTS

| | | |
|---|---|---|
| 2,613,133 | Anderson | Oct. 7, 1952 |
| 2,762,505 | Lawver | Sept. 11, 1956 |
| 2,788,257 | Duke | Apr. 9, 1957 |